May 9, 1933.   A. W. W. VAN HOORN ET AL   1,907,905
ROLLER BEARING
Filed July 28, 1931
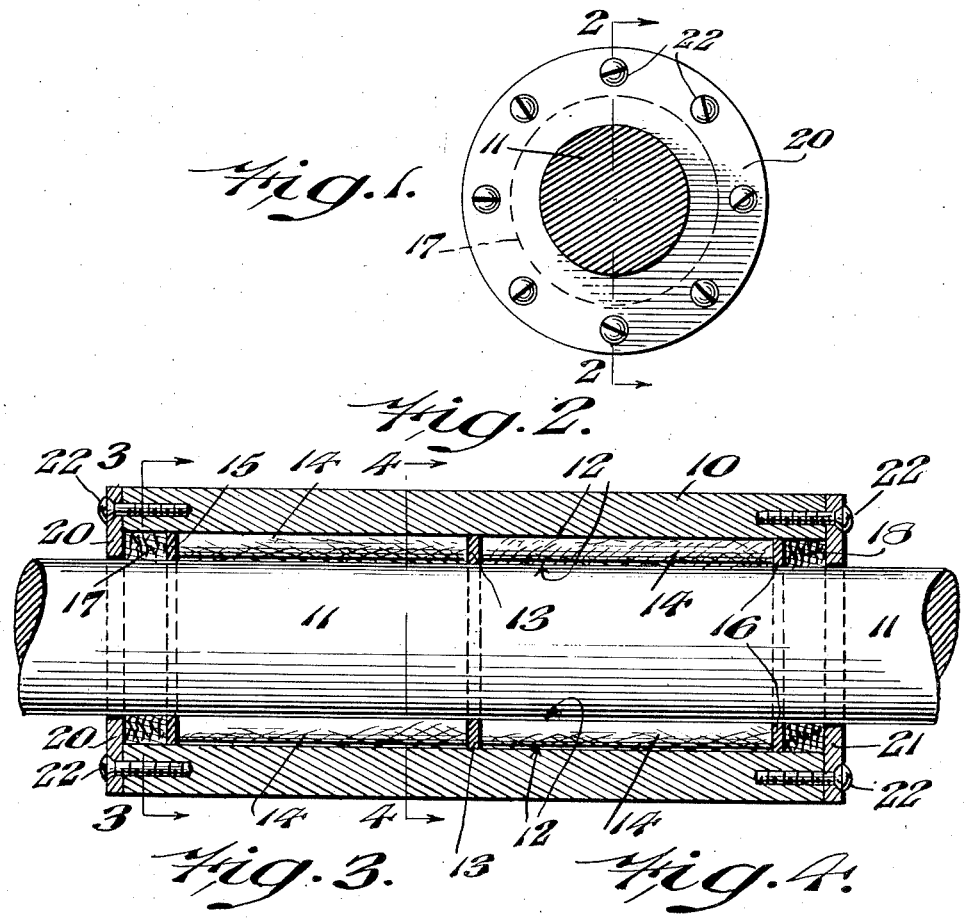
INVENTOR.
Albert W. W. Van Hoorn and
Joseph S. Tatnall,
by Robert M. Barr
ATTORNEY.

Patented May 9, 1933

1,907,905

UNITED STATES PATENT OFFICE

ALBERT W. W. VAN HOORN, OF HILLCREST, AND JOSEPH S. TATNALL, OF CLAYMONT, DELAWARE, ASSIGNORS TO NATIONAL VULCANIZED FIBRE COMPANY, OF WILMINGTON, DELAWARE, A CORPORATION OF DELAWARE

ROLLER BEARING

Application filed July 28, 1931. Serial No. 553,498.

The present invention relates generally to bearings of the roller type, but more specifically to such bearings operating in water or other liquids.

In roller bearings heretofore upon the market little has been done to distinguish between the use of the bearings and metal rollers have been employed whether the bearing is to operate exposed to water or otherwise. Whatever has been done toward a satisfactory bearing for under water use has been in the direction of lubrication rather than through a solution of the problem by improvements in the bearing per se. Where metal bearings journal metal shafts under water or are exposed to water circulating as a lubricant sand, grit and other foreign harsh particles soon cut, wear or otherwise damage the bearing to the extent of destroying its usefulness. Also, unlike metals under water or exposed to water are the source of an electrolytic action which at once begins to eat away the bearing and soon necessitates its replacement. If the shaft and the bearing were made of the same metal there would be the well known seizing or "freezing" of the parts so this precludes the use of like metals.

The present invention avoids and overcomes these and other disadvantages inherent to the use of metal roller bearings and has for some of its objects to provide an improved bearing; to provide a bearing which can be used in the presence of water without the deterioration and wear incident to bearings now in use; to provide a bearing of the roller type wherein the rollers are of a material dissimilar to the material of the shaft supported thereby and eliminate conditions of electrolysis; to provide a simple and effective bearing for shafts journalled under water; to provide a bearing construction which is unaffected by sand and other detergent particles carried in suspension; to provide a roller bearing wherein the parts function efficiently without requiring a cage for the rollers; to provide a roller bearing for use exposed to water wherein provision is made for preventing sand and grit from coming in contact with the rollers; and to provide other improvements as will hereinafter appear.

In the accompanying drawing Fig. 1 represents an end elevation of a bearing embodying one form of the present invention; Fig. 2 represents a section on line 2—2 of Fig. 1; Fig. 3 represents a section on line 3—3 of Fig. 2; and Fig. 4 represents a section on line 4—4 of Fig. 2.

Referring to the drawing one form of the present invention consists of a housing 10 preferably of metal and may be similar to the metal of the shaft 11 which is to be journalled in the bearing. This housing 10 is of open-ended tubular form having an internal diameter sufficiently greater than the shaft 11 to provide a concentric circumferential space 12 encircling the shaft 11 in assembled condition. The housing 10 is arranged to be fixedly held in any well known manner to provide the required support for the shaft 11. As here shown the space 12 is divided axially by a transverse spacing washer 13 though this is more particularly employed in long bearings and may be found unnecessary in relatively short bearings.

For the purpose of reducing friction to a minimum and overcoming the many disadvantages of metal rollers, the space 12 receives a plurality of rollers 14 arranged in parallel relation with respect to each other and to the axis of the shaft 11. In accordance with the present invention these rollers 14 are each made of bakelite, phenolite, or molded synthetic resinous material, or any other fibrous composition capable of producing the new and unexpected results obtained by the present invention. Where, as here shown, there are two sets of rollers arranged in end to end relation but spaced by the washer 13, the rollers at one side are held against end displacement by a thrust washer 15 which encircles the shaft 11 and fits snugly against the inner face of the housing 10. In like manner a thrust washer 16 serves the same purpose for the roller 14 at the opposite side of the bearing.

In order to prevent sand and other foreign matter from entering the bearing, rings 17 and 18 of felt, flax or other suitable material are located about the shaft 11 and respectively about the outer faces of the thrust washers 15 and 16, in which position they are held securely compressed by annular lock plates 20 and 21. Screws 22 serve to retain the plates 20 and 21 in operative assembled condition. Thus while water may enter the bearing and function as a lubricant it is practically impossible for any foreign matter contained therein to pass the rings of felt or other material, though should some substance accidentally work into the space where the rollers 14 are its damaging effect would be nil as compared to the effect where metal rollers are used.

While in the foregoing, two sets of rollers are described it is to be understood that this is only illustrative of the preferred form of the invention and that in some instances but one set of rollers may be used with good results.

It will now be apparent that a complete unitary bearing has been devised wherein rollers of specially treated fibre are employed for coaction with the metal of a supported shaft and bearing housing. The new result obtained by this construction is brought about by the lack of electrolysis, the elimination of foreign substances in the water to which the rollers are exposed, non-corrosion of the essential parts, and long life with continuous smooth operation.

Having thus described our invention, we claim:

1. As a new article of manufacture a bearing for under water use having a plurality of rollers of molded synthetic resinous material.

2. As a new article of manufacture a bearing for under water use having a plurality of rollers of laminated synthetic resinous material.

3. A bearing to be exposed to water or other liquid comprising a housing arranged to receive a rotatable shaft, and rollers composed of a fibrous material impregnated and bound together with a synthetic resinous material located between said housing and said shaft.

Signed at Wilmington, county of New Castle, State of Delaware this 24th day of July, 1931.

ALBERT W. W. VAN HOORN.
JOSEPH S. TATNALL.